Feb. 11, 1936.　　　G. W. WALTON　　　2,030,235

OPTICAL VALVE

Filed Oct. 4, 1933

Inventor
George W. Walton
By Cushman Darby & Cushman

Patented Feb. 11, 1936

2,030,235

UNITED STATES PATENT OFFICE 2,030,235

OPTICAL VALVE

George William Walton, London, England

Application October 4, 1933, Serial No. 692,193
In Great Britain August 19, 1932

10 Claims. (Cl. 88—61)

The present invention relates to optical valves of the kind in which polarized light is used, the plane of polarization of the light being rotated, or some equivalent effect being produced, and the resulting light being passed through an analyzing device. According to extent of rotation or equivalent effect, more or less light passes through the analyzer. Examples of arrangements of this kind are those using the Kerr or the Faraday effects.

It is an object of the present invention to provide an optical valve of the kind referred to in which a greater amount of light than hitherto can be controlled.

According to the present invention, an optical valve of the kind referred to embodies a double image prism. The doubly refracting material used for this prism is preferably so arranged as to produce an angular deviation between the ordinary and extraordinary rays.

Figure 1:
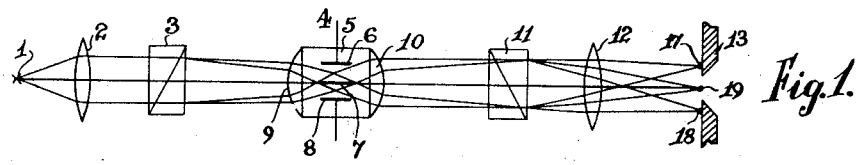
Figure 2:
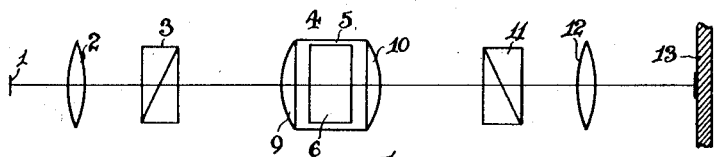
Figure 3:
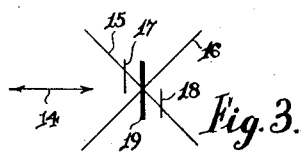
Figure 4:
Figure 6:
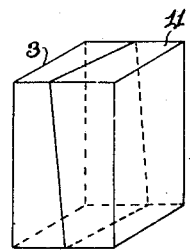
Figure 5:
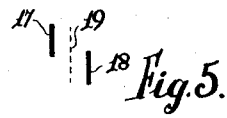
Figure 7:
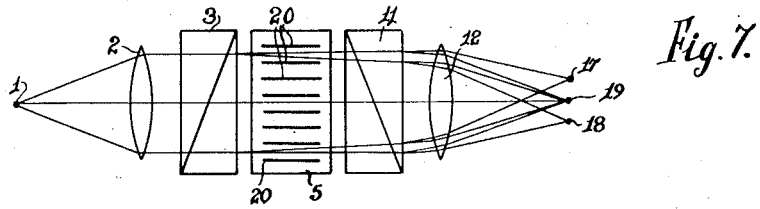
Figure 8:
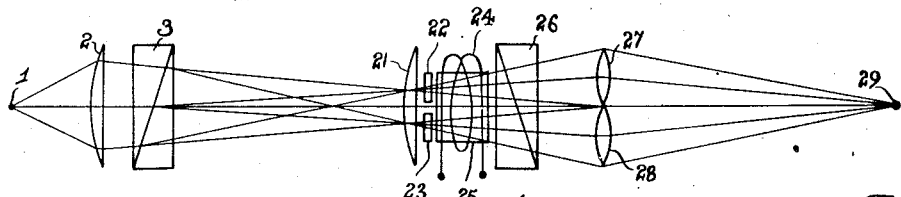

The invention will be described by way of example with reference to the accompanying drawing in which Figs. 1 and 2 are diagrammatic views in plan and elevation respectively of one arrangement according to the invention using the Kerr effect, Figs. 3, 4 and 5 are diagrams illustrating the behaviour of the apparatus of Figs. 1 and 2, Fig. 6 shows double image prisms which may be used according to the invention, Fig. 7 shows diagrammatically a modified arrangement according to the invention, also using the Kerr effect and Fig. 8 shows diagrammatically an arrangement according to the invention using the Faraday effect.

Like parts in the several figures are given the same references.

Referring now to Figs. 1 and 2, light from a source 1 passes through a lens 2 and a double image prism 3 on to a Kerr cell 4. The light source 1 is preferably elongated and may be in the form of a filament lamp or an illuminated slit for example. The long dimension of the light source is shown in the drawing as arranged at 45 degrees to the plane of angular deviation produced by the prism 3. The double image prism 3 may be a Wollaston prism. The Kerr cell 4 may comprise a container 5 in which is a liquid, such as nitrobenzene, which exhibits doubly refracting properties under electrical stress, and within the container are three plate electrodes 6, 7 and 8. The outer plates 6 and 8 may be connected together and to one terminal of a source of electrical oscillations in accordance with which the light intensity is to be controlled whilst the centre plate 7 may be connected to the other terminal. Alternatively where a so-called push-pull output is available the plates 6 and 8 may have their potentials oppositely varied with respect to the plate 7 which is connected to the neutral point. The ends of the cell are shown constituted by spherical lenses 9 and 10 but these lenses may, if desired, be replaced by prisms or cylindrical lenses.

Light emerging from the Kerr cell 4 passes through a second double image prism 11, which may be similar to the prism 3, and through a lens 12 on to an apertured screen 13.

Of the two images of the source 1 produced by the system 2, 3 and 9, one is arranged to lie between the plates 6 and 7 and the other between the plates 7 and 8 of the Kerr cell. The system 10, 11 and 12 forms two images from each of these images on the screen 13 and, of the four images thus produced, the two centre images are by suitable optical adjustment arranged to be coincident and to fall upon the aperture in the screen 13. In Fig. 3 there is shown an end elevational view of the images formed at 13. The arrows 14 represent the directions of the electrical stress produced between the plates of the Kerr cell and the lines 15 and 16 represent the planes of polarization of the two rays from the prism 3. It will be seen that the planes of polarization are both arranged to be at an angle of 45° to the direction of the electrical stress. The outermost images are shown at 17 and 18 whilst the two coincident centre images are shown at 19. As the electrical stress is increased and decreased, the brightness of the three images varies between the limits illustrated by Figs. 4 and 5. In Fig. 4 the outer images 17 and 18 have no intensity and the image 19 has maximum intensity and in Fig. 5 the centre image 19 has no intensity and the two outer images have maximum intensity. The brightness of image 19 in Fig. 4 is equal to the sum of the brightnesses of the images 17 and 18 in Fig. 5. In the mean operating condition when no oscillatory potential is applied to the plates of the Kerr cell, the conditions are as shown in Fig. 3, the brightness of the image 19 being equal to the sum of the brightnesses of the images 17 and 18. In Figs. 3 to 5, the brightness of the images is indicated by their size although in practice the size would not vary appreciably.

Instead of the double prisms 3 and 11 there may be used single prisms of doubly refracting material such as Iceland spar for example. Such prisms may have the shape shown in Fig. 6 where it will be noted that when the two prisms 3 and 11 are placed together they form a rectangular solid. By the use of single prisms instead of double prisms the loss of light can be considerably reduced.

In the modified arrangement of Fig. 7, a grid type Kerr cell is used and rays from the source 1 pass in a substantially parallel beam through the cell electrodes 20. Three images are, as before, formed as shown at 17, 18 and 19.

Alternate electrodes 20 are connected together and the polarizing potential difference and the varying potential difference are applied between the two sets. The effect produced is the same as that described in connection with Figures 3 to 5.

In Fig. 8, the double image of the light source 1 produced by the prism 3 is formed, with the aid of a lens 21, in the neighborhood of a device 22, 23. The elements 22 and 23 serve to produce opposite rotations of the planes of polarization of fixed amount and the rotations are arranged to be such that the rays emerging from the device 22, 23 are polarized in substantially parallel planes. The elements 22 and 23 may for example be quartz plates. The light then passes through the coil 24 of a Faraday cell. Within the coil 24 is a block 25 of suitable transparent material such as heavy glass. Current which is to be used to control the light intensity is passed through this coil 24 and produces a magnetic field parallel to the optical axis of the apparatus. The light then passes through a prism 26 which in this case, due to the use of the device 22, 23, may have only one plane of polarization and may therefore for example be a Nicol prism. In order to form a single image from the two which would otherwise be produced, two lenses 28 and 27 are provided forming a single image at 29. If desired the quartz plates may be omitted from the arrangement of Fig. 8 and they may, if desired, be used in the Kerr cell arrangements of Figs. 1, 2 or 7. Similarly the elements 24 and 25 of the Faraday cell in Fig. 8 can be used in place of the Kerr cell 4 in Figs. 1 and 2 or 5, 20 in Fig. 7.

Although in the arrangements described in Figs. 1, 2 and 7 use is made of the centre image 19, clearly use can also be made, if desired, of the outer images, since these images also vary in intensity. For example where the invention is employed for sound recording the electrical oscillations corresponding to the sounds to be recorded may be applied to the electrodes of the Kerr cell or to the terminals of the Faraday cell coil, as the case may be, and all three images 17, 18 and 19 may be recorded upon a travelling photo-sensitive film. In reproduction, the light from images 17 and 18 may be arranged to fall upon one cell, or upon two connected cells, and the light from image 19 may fall upon another cell. The currents so produced are in so-called push-pull relation and may be fed to the input of a push-pull amplifier.

I claim:

1. An optical valve comprising two double image prisms each yielding ordinary and extraordinary rays with angular deviation therebetween, means between said prisms for in effect rotating the planes of polarization of light passed therethrough in accordance with an applied influence and means for causing said ordinary and extraordinary rays to produce substantially superimposed images.

2. An optical valve comprising a polarizing device, an analyzing device, a Kerr cell disposed between said devices, and means for suppressing a portion of the light from said analyzing device, both said devices being in the form of double image prisms.

3. An optical valve comprising a polarizing device, an analyzing device, a coil between said devices surrounding a transparent medium and having its axis passing through said devices, and means for suppressing a part of the light from said analyzing device, both said devices being in the form of double image prisms.

4. An optical valve comprising a polarizing device in the form of a double image prism adapted to polarize in two relatively inclined planes, an analyzing device, means between said devices for in effect rotating said planes of polarization in accordance with an applied influence, and means for producing a relative rotation of said planes of fixed amount such as to render said planes of polarization substantially parallel to one another.

5. An optical valve comprising, in the order named, a light source, a double image prism, means for in effect rotating the planes of polarization of light from said source in response to an applied influence, an analyzing device, and an apertured member positioned to suppress a part of the light emerging from said analyzing device.

6. An optical valve comprising, in the order named, an elongated light source, a double image prism, means for in effect rotating the planes of polarization of light from said source in response to an applied influence, an analyzing device, and means for suppressing a part of the light from said analyzing device.

7. An optical valve for controlling the intensity of a beam of light in accordance with an applied influence, said valve comprising a polarizing device of doubly refracting material positioned in the path of said beam to produce separation of ordinary and extraordinary rays therefrom, controlling means positioned in the path of said ordinary and extraordinary rays to in effect rotate the plane of polarization of said rays in accordance with said applied influence, an analyzing device positioned in the path of said ordinary and extraordinary rays after emergence from said controlling means and means for suppressing a part of the light emerging from said analyzing device.

8. An optical system comprising a light source, a member for obstructing a part of the light falling thereon, two bodies of doubly refracting material arranged in the path of light from said source to said member and having between them a device for in effect rotating the plane of polarization of light passed therethrough and means for causing the ordinary and extraordinary rays from said bodies to form in the vicinity of said member four images of said light source, two of said images being substantially coincident.

9. An optical valve for controlling the intensity of a beam of light in accordance with an applied electrical influence, comprising a polarizing device, an analyzing device, controlling means between said devices to in effect rotate the planes of polarization of light passed therethrough in accordance with said applied influence, and means on the side of said analyzing device remote from said control means and suppressing the portion of the light from said analyzing device, at least one of said devices being a double image prism.

10. An optical valve comprising two double image prisms each yielding ordinary and extraordinary rays, means between said prisms for in effect rotating the plane of polarization of light passed therethrough, and an apertured member so positioned that a part of the light from said ordinary and extraordinary rays can pass therethrough.

GEORGE WILLIAM WALTON.